United States Patent [19]

Bhimani

[11] 3,786,416

[45] Jan. 15, 1974

[54] OPTICAL CHARACTER IDENTIFICATION

[75] Inventor: Chetan Vijaysinh Bhimani, Arlington, Va.

[73] Assignee: Recognition Equipment, Incorporated, Irving, Tex.

[22] Filed: Sept. 28, 1971

[21] Appl. No.: 184,537

[52] U.S. Cl. .............. 340/146.3 AC, 340/146.3 AE

[51] Int. Cl. .............................................. G06k 9/12

[58] Field of Search .......................... 340/146.3 AC

[56] References Cited

UNITED STATES PATENTS

| | | | |
|---|---|---|---|
| 3,407,386 | 10/1968 | Spanjersberg | 340/146.3 AC |
| 3,142,818 | 7/1964 | Holt | 340/146.3 AE |

*Primary Examiner*—Maynard R. Wilbur
*Assistant Examiner*—Robert F. Gnuse
*Attorney*—Richards, Harris & Hubbard

[57] ABSTRACT

Printed characters, superimposed upon a contrasting center bar extending through a character field, are identified by scanning each character along a plurality of vertically aligned, laterally spaced paths to generate character signals dependent upon encountering character portions. An output signal is produced in response to the character signals and control signals. In a preferred mode for alphanumeric characters, white signals and black signals are generated, which are representative of white and black fields at each of a plurality of points along each scan path. Control signals are generated in response to a scan encountering the center bar. The character portions on either side of the center bar are scanned separately and different techniques are used to analyze the character information obtained to generate enclosed point signals and nonenclosed point signals. In both data processing techniques the enclosed point signals for a plurality of separate zones of the character field are compared with a code to produce character identification signals.

11 Claims, 13 Drawing Figures

OPTICAL CHARACTER IDENTIFICATION

BACKGROUND OF THE INVENTION

1. Field of the Invention

The invention relates to automatic identification of alphanumeric characters and, more particularly, to the sensing of enclosed character areas in each of a plurality of fields within a boundary formed by the character and the center bar. Enclosed character areas are sensed both by character feature migration and by tracking character lines and detecting intersections thereof to generate enclosed point signals. The enclosed character areas generated are compared with predetermined codes for character identification. for some special characters, the number of character line crossings of the center bar and the ratio of the projections of separate character portions are employed to assist in making a character decision.

2. History of the Prior Art

The wide variety with which a given character may be executed has led to restriction in execution of documents designed to be employed in automatic readers. In magnetic ink character recognition systems, certain zones of the character have well defined areas of varying proportions covered by magnetic materials in order to produce distinctive features and signals as the characters pass a magnetic reading station. In systems where handprinted characters are to be employed, it has been found desirable to impose constraints upon the form of execution in order that the mechanism employed in identification may be greatly simplified.

In certain optical handprint character recognition techniques, such as that disclosed and claimed in copending application, Ser. No. 29,485, filed Apr. 17, 1970, in the name of Arthur W. Holt, and assigned to the assignee of the present invention, the character is scanned from the outer extremity of the character towards the center bar both from top to bottom and from bottom to top to resolve the topology of that portion of the character. To resolve the total topology of the character, the character is also scanned from the center bar out toward the outside extremity of the character again from top to bottom and from bottom to top. The scanned data obtained in scanning from the center bar outwardly is stored, read out in reverse order and then processed just as if it had been scanned from the outside in towards the center bar. While this prior art method is extremely important in certain applications, the requirements of scanning in two directions vertically and storing data for reverse readback necessitates relatively expensive hardware. The present invention eliminates the need for such circuitry.

The present system for resolving the topology of a character involves both a technique for scanning a character in one vertical direction toward the center bar and a technique for scanning a character in one vertical direction from the center bar outward. Moreover, the "center bar outward technique" of the present invention may be advantageously employed in combination with that disclosed in the Holt application, referenced above, wherein the Holt technique is used to scan the character from, for example, the left most extremity of a character towards the center bar and then the system of the present invention is employed to scan the character from the center bar out towards the rightmost extremity of the character. It is to be understood however, that the system of the present invention can also be employed by scanning a character from its outermost extremity in toward the center bar, storing the data and then reading it out in reverse order to simulate scanning from the center bar outwardly similar to the storage technique employed in Holt. Further, the single vertical scan technique of the invention can be substituted directly for the dual scan Holt method.

BRIEF DESCRIPTION OF THE DRAWING

For a more complete understanding of the present invention and the advantages thereof, reference may be had to the following description taken in conjunction with the accompanying drawing in which.

DETAILED DESCRIPTION

The present invention will be described in two sections; first, the system for single vertical scan, pre-center bar processing, and second, the system for single vertical scan, post-center processing. The present invention includes not only applicant's novel systems for pre-center bar and post-center bar processing but also the combination of the two to reach a complete character decision by following a single horizontal scanning sweep in one direction across the character. Hereinafter, the center bar upon which the character to be analyzed is disposed will be referred to as the "red line."

The scanning of each character symbol is divided into two parts, pre-red line and post-red line. The pre-red line cycle starts at the left of the character field and stops when the character is approximately half-scanned, in the sequence from left to right, when the red line is detected. The object of the pre-red line cycle is to effectively collapse the topology of the left side of the character horizontally and "map it" onto the center bar and to leave in the left topology register signals which define upper and lower limits of areas enclosed by a boundary formed by the character portion and the red line. The post-red line cycle begins at the end of the pre-red line cycle. The purpose of the post-red line cycle is to effectively collapse the topology of the right side of the character horizontally and "map it" onto the center bar. Although the technique used in collapsing the topology of the character is different in the post-red line portion from the pre-red line portion the result is the same; namely, to leave in the right topology register signals which define upper and lower limits of areas enclosed by the boundary formed by the right half of the character portion and the red line.

The term topological information, as used herein, includes all of the characteristics desired and used by the present system to reach a character decision such as open/closed areas, center bar crossings, etc.

The term topo register, as used herein, refers to the topology registers of the present system which are used to store open/closed character loop information.

Pre-Red Line Processing

Figure 1:
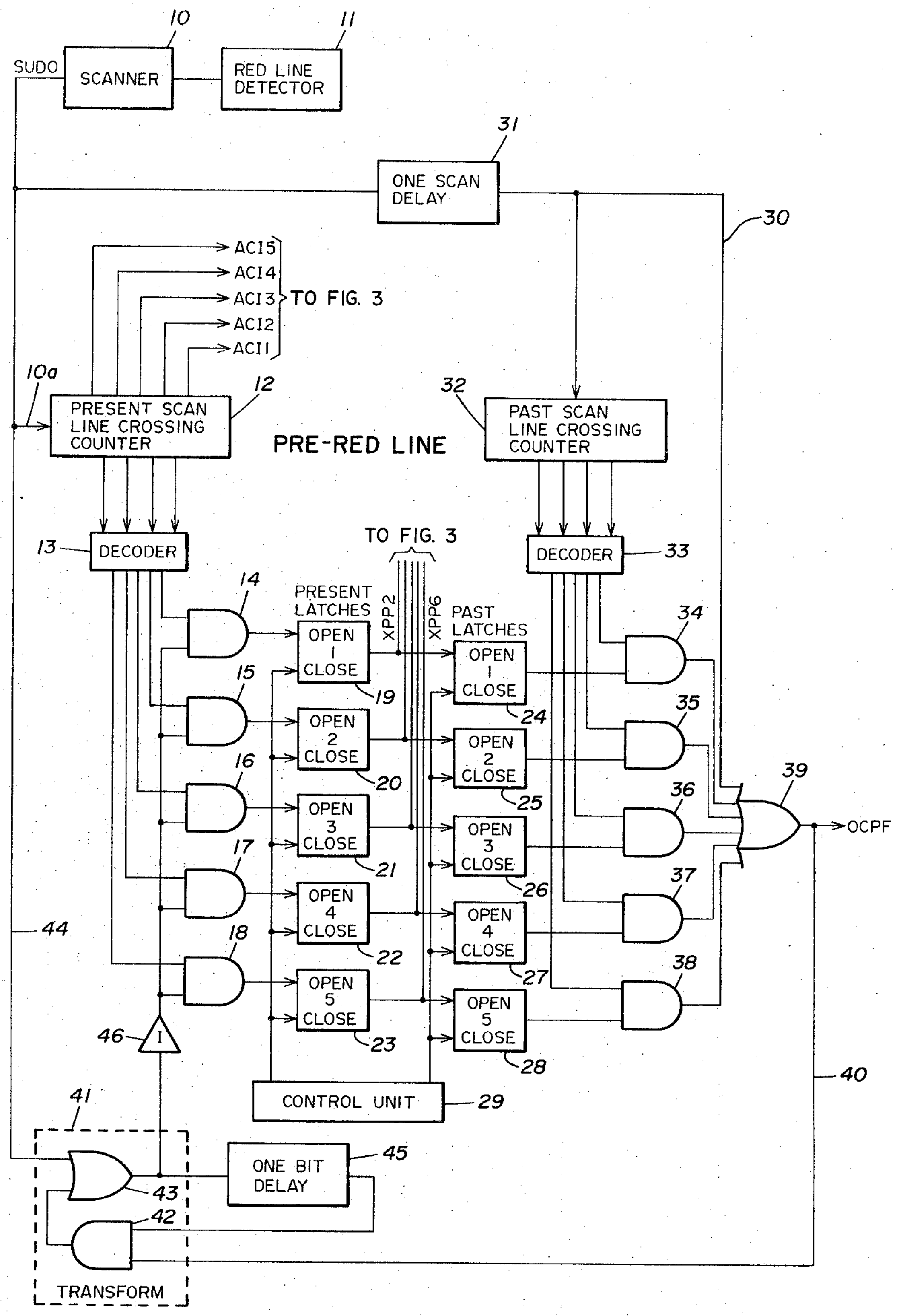
FIG. 1 is a block diagram of a single scan, toward the center bar, character processing system constructed in accordance with the invention.

Referring to FIG. 1, documents move continually past a scanning station and are repeatedly scanned along laterally spaced, vertical paths by a scanner 10. The scanner 10 produces video signals which are applied to a red line detector 11, and to a present scan line crossing counter 12. Because the documents are continuously moving, the scan paths are spaced apart in the direction of movement and the spacing between each scan is dependent upon the document speed and the scan period. Assuming that documents are moving from right to left across the scanner 10, the scanning cycle first encounters the left side of a field containing a character symbol. The scanner 10 will execute a few vertical scans before encountering the left edge of the symbol. In the embodiment herein described, from ten to thirty vertical scans were employed for each half character field.

Scanner 10 may comprise a rotating disk with equally spaced holes located at the common radius which is large compared to character height. Light reflected from the document passes through the holes in the disk and, via a suitable optical system, onto a photocell. Such scanners are well known in the art. Alternatively, the scanner may comprise a single column of photocells whose elements are gated sequentially to scan the documents vertically.

In either event the output signal from the scanner is gated into a logic system, and, in the present embodiment, 48 samples were obtained per column.

The principal mode of operation of the pre-red line system involves processing the signals from each column in the sequence of the column to identify the existence of areas which are enclosed within a boundary formed by a character loop and the center bar. More particularly, referring to FIG. 2 the red line 4 passes through the numeral "2". The upper right hand character portion 5 and the red line 13 enclose an area. The upper left hand character portion 6 does not enclose an area. The lower left hand portion 7 and the red line 4 enclose an area. The lower right hand portion 8 does not enclose an area.

An object of the invention is to process the pre-red line scan signals produced by gating the photocell output, 48 samples per scan, to identify the portions above and below red line crossings which have enclosed areas and the portions which do not have enclosed areas. Thus, multiple bits of information defining open and closed areas are provided. This information forms a multi-bit code capable of identifying a plurality of characters. The present example will assume that only the numerals "0 - 9", the characters "P" and "E" and the symbol "=" are to be identified.

Returning now to FIG. 1, the output of the scanner 10 is connected to a present scan line crossing counter 12 which counts the number of black to white transitions in the video output signal during each scan.

The present scan line counter 12 is connected to a decoder 13. The output of the decoder 13 is connected to actuate one input each of a plurality of AND gates 14 - 18. The outputs of the AND gates 14 - 18 are connected to the "set" inputs of a plurality of present latches 19 - 23 the outputs of which are in turn connected to the "set" inputs of a plurality of past latches 24 - 28. The "reset" inputs of present latches 19 - 23 and past latches 24 - 28 are connected to a control unit 29 which provides reset pulses to the latches and other components at the end of each scan cycle, as will be further explained below. The embodiment of the invention shown in FIG. 1 accommodates a character having four vertical crossings which requires three latches. The other two latches are provided to allow for any discolorations or "dirt" on the surface of document which might be mistaken for a character line and cause a black to white transition in the scanner 10. the output of the scanner 10 is also connected through a one scan delay unit 31 to a past scan line crossing counter 32 which is in turn connected to a decoder 33. The one scan delay unit 31 is connected via lead 30 to an OR gate 39. The outputs of the decoder 33 are connected to actuate one input each of a plurality of AND gates 34 - 38. The other inputs of each of the gates 34 - 38 are connected from the outputs of the past latches 24 - 28, respectively. The output of the one scan delay unit 31 and the outputs of all of the AND gates 34 - 38 are connected to the OR gate 39. The OCPF output signal from the OR gate 39 is fed back over line 40 to a transform unit 41 which comprises an AND gate 42 and OR gate 43. The video output from the scanner 10 is connected through line 44 to one of the inputs of the OR gate 43. The signal from the OR gate 43 is connected both to a one bit delay unit 45 and through an inverter 46 to the AND gates 14 - 18. The output of the bit delay unit 45 is connected to the other input of the AND gate 42, the output of which is coupled to the OR gate 43. The output of the transform unit 41 is taken from the OR gate 43 to enable gates 14 - 18 through the inverter 46.

Figures 2, 3, 4:
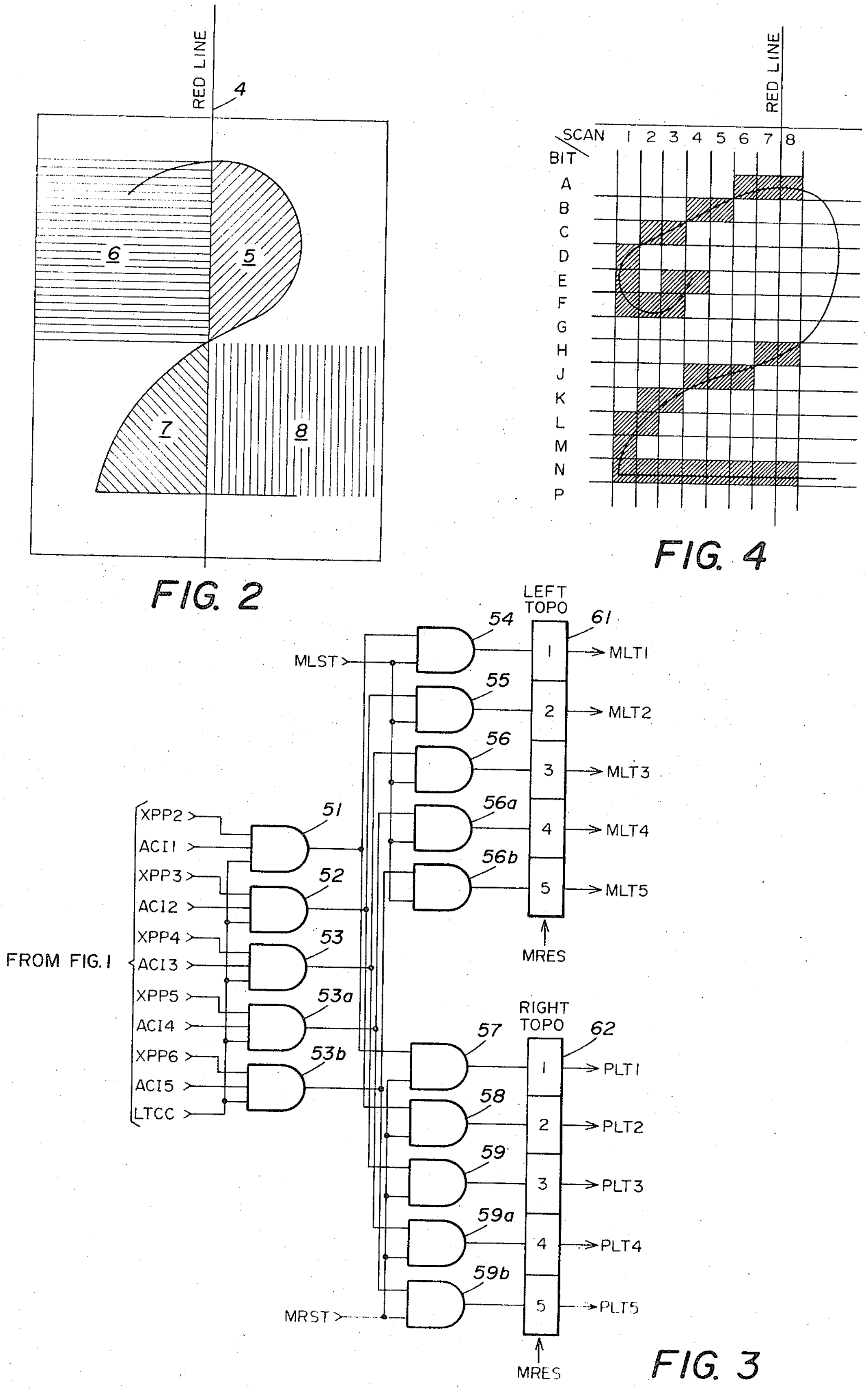
FIG. 2 illustrates execution and analysis of the character "two" (2) in accordance with the invention.
FIG. 3 is a schematic diagram of topology storage registers used in conjunction with the invention.
FIG. 4 illustrates the pre-center bar portion of the character "two" (2) and the data processed during scanning in accordance with the invention.

Leads AC11 - AC13 and XPP2 - XPP4 extend from the present scan line crossing counter 12 and the present latches 19 - 23 to the output circuitry shown in FIG. 3. In FIG. 3, a plurality of AND gates 51 - 59 are selectively connected to a left topo register 61 and a right topo register 62 which store the topological information processed by the circuit of FIG. 1. When the circuitry of FIG. 1 is used to analyze the pre-red line character information, and hence the left half of the character, the output information is stored in the left topo register 61.

The end product of data processing by the pre-red line circuitry of FIG. 1 is the condition of the present latches 19 - 23 upon detection of the red line by the detector 11. At the red line, the present scan line crossing counter 12 indicates the number of character lines which have been crossed during scanning. The open or closed condition of the present latches 19 – 23 at the red line determines the number and position of enclosed areas within the left half of the character. The enclosed area information from the present latches 19 – 23 is input to the AND gates 51 – 53, of FIG. 3, which are in turn connected selectively to the left topo register input AND gates 54 — 56 and the right topo register input AND gates 57 – 59. The transfer of topo information is under control of timing strobe signals on the MLST and MRST leads.

The scanning of each character symbol is divided into two parts, pre-red line and post-red line. The pre-red line cycle starts at the left of the character field and stops when the character is approximately half-scanned, in the sequence from left to right, when the red line is detected. The object of the pre-red line cycle is to effectively collapse the topology of the left side of the character horizontally and "map it" onto the center bar and to leave in the left topo register 61 signals which define upper and lower limits of areas enclosed by a boundary formed by the character portion and the red line. The post-red line cycle begins at the end of the pre-red line cycle. The purpose of the post-red line cycle is to effectively collapse the topology of the right side of the character horizontally and "map it" onto the center bar. Although the technique used in collapsing the topology of the character is different in the post-red line portion from the pre-red line portion the result is the same; namely, to leave in the right topo register 62 signals which define upper and lower limits of areas enclosed by the boundary formed by the right half of the character portion and the red line.

Following the end of both the pre-red line and the post-red line cycles, the signals stored in the topo registers 61 and 62 are applied to a truth table where they are compared with a stored code to produce a signal indicative of the character being scanned.

The results of mapping constrained character symbols onto a vertical center bar can be reduced to a code in which a one means an enclosed area present and a zero means no enclosed area present. A character decision is made from the enclosed area information, taking into account the fact that the number 1 involves only one crossing of the red line, characters "4", "7", "0", "P" and "=" involve two crossings and the remainder involve three crossings.

In order to obtain closed point signals for the pre-red line cycle, signal transformations are performed in the circuitry of FIG. 1. Signal transformation is necessary because the scan output signals from scanner 10 are of a one bit code and are either a zero or a one, where:

one (1) = photocell registration with a black area; and zero (0) = photocell registration with a white area.

In the processing of the data from the scanner 10 by the circuitry of FIG. 1, a decision is made as to whether a point is closed (black) or open (white) on a bit by bit basis. The transform rules for making the decision are:

1. If the present bit under consideration is black it is defined as and remains black (closed).
2. If the present bit under consideration is white, the past bit in the same scan (bit delayed) is black and the same bit in the past scan (scan delayed) is black, then the white bit is called black (closed).
3. If neither rule 1 nor 2 is true for a bit, the bit remains white and forces each preceding bit in that scan to become white (open) even though those bits may have been closed under rule 2. This "force to open" condition on preceding bits in a scan stops once a true black bit, under rule 1, in that scan has been reached.

In processing data produced by scanning the numeral "2", FIG. 4, the input information on path 10a from the output of the scanner 10, FIG. 1, is shown in Table I

TABLE I

| Column | 1 | 2 | 3 | 4 | 5 | 6 | 7 |
|---|---|---|---|---|---|---|---|
| row A | 0 | 0 | 0 | 0 | 0 | 1 | 1 |
| row B | 0 | 0 | 0 | 1 | 1 | 0 | 0 |
| row C | 0 | 1 | 1 | 0 | 0 | 0 | 0 |
| row D | 1 | 0 | 0 | 0 | 0 | 0 | 0 |
| row E | 1 | 0 | 1 | 1 | 0 | 0 | 0 |
| row F | 1 | 1 | 1 | 0 | 0 | 0 | 0 |
| row G | 0 | 0 | 0 | 0 | 0 | 0 | 0 |
| row H | 0 | 0 | 0 | 0 | 0 | 0 | 1 |
| row J | 0 | 0 | 0 | 1 | 1 | 1 | 0 |
| row K | 0 | 1 | 1 | 0 | 0 | 0 | 0 |
| row L | 1 | 1 | 0 | 0 | 0 | 0 | 0 |
| row M | 1 | 0 | 0 | 0 | 0 | 0 | 0 |
| row N | 1 | 1 | 1 | 1 | 1 | 1 | 1 |
| row P | 0 | 0 | 0 | 0 | 0 | 0 | 0 |

The information in Table II represents each column results after the circuitry of FIG. 1 has applied the transform rules above to the data of table I.

TABLE II

| Column | 1 | 2 | 3 | 4 | 5 | 6 | 7 | 8 |
|---|---|---|---|---|---|---|---|---|
| row A | 0 | 0 | 0 | 0 | 0 | C | C | C |
| row B | 0 | 0 | 0 | C | C | 0<br>¢ | 0 | 0 |
| row C | 0 | C | C | C | 0<br>¢ | 0 | 0 | 0 |
| row D | C | C | C | C | 0<br>¢ | 0 | 0 | 0 |
| row E | C | C | C | C | 0<br>¢ | 0 | 0 | 0 |
| row F | C | C | C | 0 | 0 | 0 | 0 | 0 |
| row G | 0 | 0 | 0 | 0 | 0 | 0 | 0 | 0 |
| row H | 0 | 0 | 0 | 0 | 0 | 0 | C | C |
| row J | 0 | 0 | 0 | C | C | C | C | C |
| row K | 0 | C | C | C | C | C | C | C |
| row L | C | C | C | C | C | C | C | C |
| row M | C | C | C | C | C | C | C | C |
| row N | C | C | C | C | C | C | C | C |
| row P | 0 | 0 | 0 | 0 | 0 | 0 | 0 | 0 |

It will be understood that the example of Tables I and II is based upon 14 points per column rather than 48 points per column as earlier described, the 14 point case being adopted solely to simplify the graphic example in the above tales. Thus, Table II represents a simplified scan sequence of eight successive columnar scans of the numeral "2" with 14 video outputs for each columnar scan. the video outputs are in the one bit code to represent a black (1) or white (0) output condition. The data of Table I is transformed one column at a time to data shown in Table II during the scan of each column.

The transformed signals as stored in the present latches 19 – 23 of FIG. 1, are written and modified during each vertical scan of the symbol field with progressive change of the signals as the scan proceeds toward the red line. The information in the present latches together with the count in the present scan line crossing counter 12 carry forward a code indicating the existence and the vertical extent of an enclosed area and its location along the vertical scale.

In operation, the character data from the scanner 10 illustrated in Table I, are transformed into the data of Table II by the circuitry of FIG. 1. The data is processed on a scan-by-scan basis as follows.

Scan 1

At the beginning of each scan the present latches 19 – 23 are reset by the control unit 29 to a closed condition. Since the present scan line crossing counter 12 is only incremented upon the occurrence of a black to white transition in the incoming data from the scanner 10, there is initially a count of zero in the counter 12. The output of the decoder 13 is low on all leads and none of the AND gates 14 – 18 are enabled. No data is present at the output of the one scan delay unit 25 because column 1 is the first column to be scanned.

Upon the black to white transition from bit F to G of Scan 1 the present scan line crossing counter 12 is incremented, its output decoded and one of the leads of AND gate 14 is enabled. In the description of the present invention, reference to "fits" A – P is intended to refer to "fit positions" A – P of each scan. Since bit G is white, a low is impressed upon lead 44 to the OR gate 43. Because there is a low signal on lead 40, the output of OR gate 43 is a low which is inverted by the inverter 39 and a high is impressed upon the other lead of the partially enabled AND gate 14 to produce an output signal and open the first present latch 19. Once a latch has been opened it will remain open for the remainder of the scan. It is not until the black to white transition between bits in N and P that the present scan line crossing counter 12 is incremented and decoded to partially enable the AND gate 15. At bit P signals on leads 44 and 40 are both low and the low output of the transform 41 is inverted by inverter 46 to open the second present latch 18. AT the end of the first scan, the contents of the present latches are transferred into the past latches as follows: first past latch 24 – open; second past latch 25 – open; and the remainder of the past latches 26 – 28 are closed. The present latches 19 – 23 and the counters 12 and 32 are reset.

Scan 2

Beginning the second scan, the transition between bits C and D increments the present scan line crossing counter 12 which is decoded to enable the AND gate 14. Bit D is closed because the output of the one bit delay unit 45 is high while the output of the one scan delay 31, transmitted through the OR gate 39 and lead 40, to the input of the AND gate 42 is also high. The high output from gate 42 impresses a high signal through the OR gate 43 onto the input of the inverter 40 which produces a low input to the AND gate 14 and latch 19 remains closed. Similarly, bit E is also closed. In the description of the present invention, reference to a bit being "closed" or "open" is intended to refer to the closed or open condition of the latch associated with that bit.

The transition from bits F to G increments the present scan line crossing counter 12 and partially enables the second AND gate 15. At this time, the past scan line crossing counter 32 is incremented to partially enable the first past scan AND gate 34. However, because the first past latch 21 is open its output is produced from the AND gate 34. Because there is a low signal on lead 40, and the output from the scanner on lead 44 is low, a low signal is passed through OR gate 43 and inverted to a high at 46 to energize the other gate lead of the AND gate 15 and open the second present latch 20. As was stated earlier, once a latch is opened, it remains open for the duration of that scan. Accordingly for the remainder of the scan 2 bits H, J, K and L are all open. During the transition between bits L and M the present scan line crossing counter 12 is incremented to partially enable the present third AND gate 16. The output of the one scan delay unit 31 is true, i.e. high, which places a high on lead 52 through OR gate 39 and onto lead 40 leading to AND gate 42 within the transform 41. The output of the one bit delay 45 is also true to produce a high output from AND gate 42 through OR gate 43 and a false to the other input is inverted to a low at 46. The low at the input of AND gate 16 causes the present latch 19 to remain closed. The transition from bit N to p increments both the present line scan crossing counter 12 and the past line scan crossing counter 26 to enable the fourth present AND gate 17 and open the fourth present latch 22.

Scan 3

Before the beginning of the third scan, the settings of the present latches are loaded into past latches as follows: latch 24 – closed; latch 25 – open; latch 26 – closed; latch 27 – open; and latch 28 – closed. Both the present scan line crossing counter 12 and the past scan line crossing counter 32 are incremented at the transition between bits C and D to partially enable both the present AND gate 14 and the past AND gate 34. The closed condition stored in the first past latch 24, together with the decoded count of the past scan line crossing counter 32 causes a true output from OR gate 39 because the output of the bit delay is also true, the output of inverter 39 is false and first present latch 19 remains closed. The remainder of the scan 3 is similar to that which was described in connection with scan 2.

Scan 4

Before the beginning of scan 4, the code conditions of the present latches which were loaded into the past latches are as follows: latch 24 – closed; latch 25 – open; latch 26 – closed; latch 27 – open and latch 28 – closed. In scan 4, bit positions C and D are both closed in accordance with algorithm rule 2, stated above. At the transition between bit positions E and F, the second present AND gate 15 is enabled while the first AND gate 34 remains enabled. the output OCPF of the OR gate 39 is true on line 40 while the output of the one bit delay unit 45 is also true producing a false output on inverter 46 and allowing the first present latch 19 to remain closed. During the transition between bits F and G, the past scan line crossing counter 32 is again incremented to enable the second past AND gate 34. Since the second past latch 24 is open at bit G, the output OCPF from OR gate 39 is false and produces a low on line 40. These signals cause a true output from the inverter 46 which opens the second present latch 20. Because present latch 20 is now open, this forces open bit F in accordance with algorithm rule 3, stated above. The remainder of scan 4 is similar to that discussed in the previous scan.

Scan 5

Before the beginning of scan 5, the data from the present latches was loaded into the past latches as follows: latch 24 – closed; latch 25 – open; latch 26 – closed; latch 27 – open and latch 28 – closed. In scan 5 the transition between bits B and C increments the present scan line crossing counter 12 which is decoded to partially enable the first present AND gate 14. However, because the first past latch 24 is closed the output from the inverter 46 is false and the first present latch 19 remains closed. Bits D and E of scan 5 also remain closed under algorithm rule 2. The transition from bit E to F increments the past scan line crossing counter 32 to produce a false output signal from AND gate 35 and a true output from inverter 46 to open the second present latch 20. This forces open bits C, D and E of scan 5 under algorithm rule 3. The remainder of the scan is similar to that described in the previous scans. At the end of scan 5 the outputs of the present latches are loaded into the past latches as follows: latch 24 – open; latch 25 – closed; latch 26 – open; latch 27 – closed; and latch 28 – closed.

Scan 6

At bit B of scan 6, the first present latch 19 remains closed while at bit C the first present latch 19 is opened. There are no black bits in positions D, E or F. It should be recalled that once a loop in a character is opened it remains open for the remainder of the scanning operation.

Scan 7

Before the beginning of scan 7, the data in the present latches was loaded into the past latches as follows: latch 24 — open; latch 25 — closed; latch 26 — open; latch 27 — closed and latch 28 — closed. During scan 7 the red line is detected by the detector 11 and the condition of the present latches is as follows: latch 19 — open; latch 20 — closed; latch 21 — open; latch 22 — closed and latch 23 — closed. It should be noted that upon the detection of the red line the condition of the present latches determines the topology of the portion of the character which is being scanned. At the beginning of scan 8, the contents of the present latches 19 – 21 are loaded into the flip-flops comprising the left topo registers 61. Only the first three present latches 19 – 21 are considered at the red line to accommodate a character having four vertical crossings.

Pre-Red Line Logic

Figure 5:
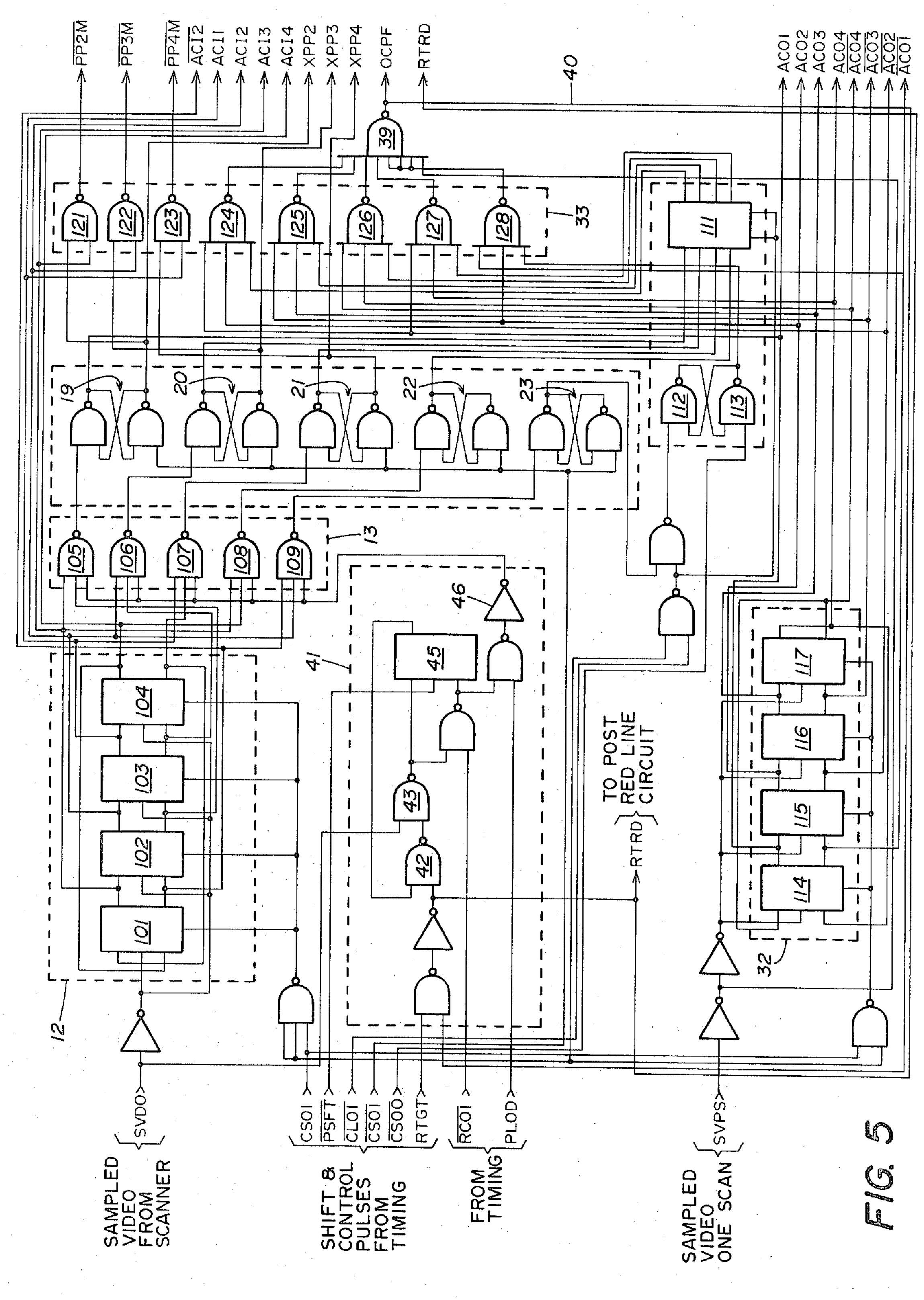
FIG. 5 is a logic diagram of the character processing system shown in FIG. 1.

Referring now to FIG. 5, there is shown a logic diagram of the pre-red line processing circuitry illustrated in the block diagram of FIG. 1. The sample video signal from the scanner is input to the pre-red line scan crossing counter 12 comprising four flip-flops 101 – 104 connected as a plural stage shift register. The various stages of the counter 12 are connected to the present scan line decoder 13 comprising a plurality of gates 105 – 109. The decoder 13 is in turn connected to the present scan latches 19 – 23. The outputs of the present scan latches 19 – 23 are connected directly to the past scan latches 24 – 28 which comprise four latches contained within a single module 111 and a fifth latch comprising cross connected gates 112 and 113.

The sample video signal from the scanner is delayed one entire scan by means such as a shift register (not shown) and input to the logic circuitry on the SVPS lead. The one scan delayed video is coupled to the input of the past scan line crossing counter 32 comprising a plurality of interconnected flip-flops 113 – 117 connected as a multi-stage shift register. The outputs of the scan line crossing counter 32 are connected to past scan decoder 33 including a plurality of gates 121 – 128, which are in turn connected to the input of the OR gate 39. The output of the OR gate 39 is an open/close profile signal OCPF which is connected back to the input of the transform 41 via lead 40. Sample video from the scanner 10 is input to the transform 41 through a flip-flop comprising the one bit delay circuit unit 45. The output of the transform 41 is connected to an input of each one of the present decoders and AND gates 13.

As can be seen, the logic circuitry of FIG. 5 implements the functions shown in the block diagram of FIG. 1. The logic serves to generate an open/close profile of a portion of a character projected upon a center bar. While the above description has been directed primarily to a pre-red line portion of the character it is to be understood that the same logic and techniques could be applied to a post-red line portion of a character by storing the scanned data and then reading that stored data out in reverse order similar to the manner in which post-red line portion of the character is stored in the application of arthur W. holt, Ser. No. 29,485, filed Apr. 17, 1970.

In the invention of the present system, it was chosen to employ a different set of algorithms for analyzing the post-red line portion of the character from that used in analyzing the pre-red line portion. Instead of analyzing a character in terms of open or closed bits the lines comprising a character portion are tracked from their beginnings at the center bar in their course of movement away from the center bar. An indication is generated upon intersection of two or more of the lines being tracked and the conclusion drawn that the intersection defines an enclosed area with the red line.

Post-Red Line Analysis

Figure 6:
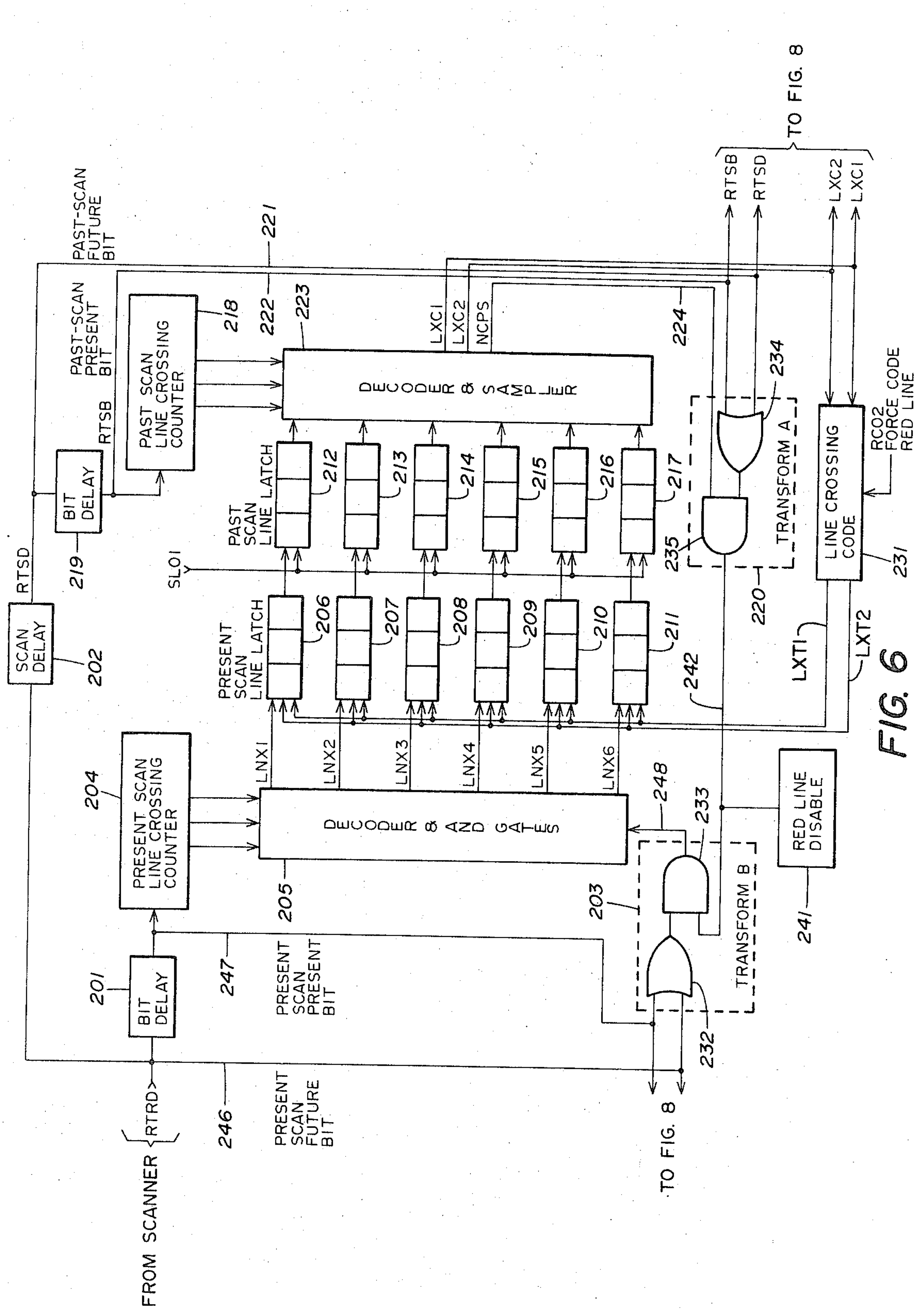
FIG. 6 is a block diagram of an "away from the center-bar" character processing system constructed in accordance with the invention.
Figure 7:
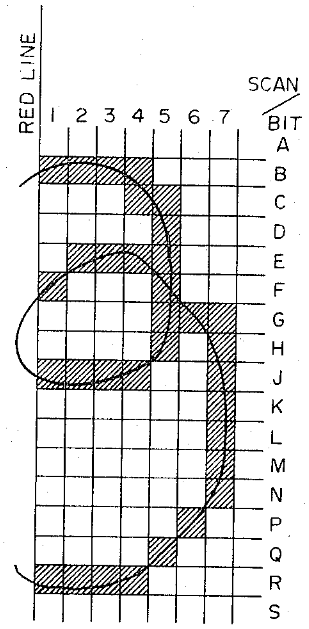
FIG. 7 illustrates the post center bar portion of a character "three" (3) and the data processed during scanning in accordance with the invention.

The circuitry shown in FIG. 6 is that used to analyze input data and track the lines comprising the character. The character "three" (3) is illustrated in FIG. 7 and the operation of FIG. 6 will be described in connection with the analysis of this character.

Referring now to FIG. 6, the scanner output data RTRD is delivered to the input of a bit delay circuit 201. The RTRD signal in actuality comes from the transform 41 shown in FIG. 5. It may, however, be thought of as identical to the scan data produced by the scanner 10 of FIG. 1. Returning to FIG. 6, the RTRD signal is connected also to the input of a scan delay unit 202 and a transform unit 203. The output of the bit delay 201 is connected to both the input of a present scan line crossing counter 204 and the transform 203. The output of the scan line crossing counter 204 is connected to a present scan decoder 205 which decodes the state of the counter 204 and produces a signal to one of six present scan line latches 206 – 211. The present scan line latches are in turn connected to six past scan line latches 212 – 217, the outputs of which are connected to a past scan decoder 218.

The output RTSD of the scan delay unit 202 is connected to a bit delay circuit 219 and to one input of a transform unit 220 via lead 221. The output RTSB of the bit delay 219 is connected both to another input of the transform 220 over lead 222 and to the past scan line crossing counter 218. The output of the counter 218 is connected to a decoder and sampler 223. One output NCPS of the decoder 223 is coupled to a third input of the transform 220 via lead 224. The outputs LXC1 and LXC2 of the decoder 223 are connected to the line code storage register 225 of FIG. 8, the outputs of which RTT1 – RTT3 are connected to a plurality of AND gates 227 – 229 and to a right topo register 230. The output of the topo register 230 is connected to truth tables which produce an actual character decision.

Referring again to FIG. 6, the LXC1 and LXC2 leads from the decoder 223 are also connected to a line crossing code detector 231 which is in turn coupled to the inputs of each one of the present scan line latches 206 – 211.

Transform 203 includes an OR gate 232, the output of which is connected to an AND gate 233. The output of the AND gate is connected to the decoder 205. The other transform 220 comprises an input OR gate 234 the output of which is connected to an AND gate 235. Both of the transforms 203 and 220 serve to make a line tracking decision dependent upon the condition of various bits within the present scan and the past scan.

The post-red line portion of the character "three" (3) is shown in FIG. 7 and will be used in a discussion of the operation of circuitry of FIG. 6.

Figure 9:
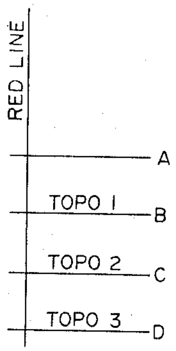
FIG. 9 illustrates the different topologies of a character from which enclosed and nonenclosed areas may be derived.

In processing the post-red line scanned data a code is assigned to each line comprising the character. When two or more of these lines meet, the codes assigned to the lines determine which areas are open and which areas are closed. As shown in FIG. 9, each one of the different lines is given a code, i.e., A, B, C and D. The area between the lines A and B is designated topo 1; that between B and C is topo 2 and the area between lines C and D is termed topo 3. If lines A and B meet, topo 1 will be closed; if lines A and C meet, both topos 1 and 2 will close while a meeting of lines A and D will close topos 1, 2 and 3.

Referring now to FIG. 6, the input to the post-red line transform circuitry is the RTRD signal which originates with the pre-red line transform circuitry of FIG. 5 but is basically a black video signal. The RTRD input goes into the bit delay unit 201, the output of which is the past bit. However, with respect to the bit delay output, the RTRD signal is the future bit. This is an important concept that is used in the post-red line circuitry of the present invention to "look ahead" at data. The RTRD input also goes to a scan delay unit 202 whose output will then be the past scan. The output of the scan delay unit 202 goes to a bit delay unit 219 whose output increments the past scan line counter 218 upon the occurrence of the black to white transition in the past scan. Here again, the input to the bit delay unit 219 constitutes a future bit with respect to the output of that unit.

Both the present scan line latches 206 – 211 and the past scan line latches 212 – 217 are each capable of storing 3 bits. The latches are used to store either a 2 bit binary code plus a "valid code" bit if certain conditions are met or a bit designated as a "no code bit." The latches of FIG. 6 are equipped to track four character lines to define three topo areas. Six latches are provided to allow for specks of dirt or discoloration in the character field. At the beginning of each scan, the contents of the present latches are transferred to the past latches while a "no code" bit is set in each of the present latches and both of the counters 204 and 218 are reset to zero. The present latches 206 – 211 are enabled by the decoder 205 which decodes the count contained within the counter 204. When the present counter 204 is reset to zero, the present latch 206 is enabled. A count of 1 within the present scan line crossing counter 204 enables the second latch 207, etc.

In order to store a line code within a particular latch selected by the decoder output, the outputs of both transforms 220 and 203 must be true. Transform 220 is associated with the past scan while transform 203 is associated with the present scan. The output of transform 220 is true if in the past scan, the present or future bit is black and there is not a no-code signal present. The output of the transform 203 will be true if in the present scan, the present or future bit is black. The transform 220 partially enables the transform 203 which in turn enables the present scan line decoder 205. The output of the decoder 205 enables the selected latch and loads it with a line code from the line crossing code unit 231.

The data stored in the present latches 206 – 211 is transferred to the past latches 212 – 217 at the end of each succeeding scan. The past scan latches 212 – 217 are decoded by the past scan line decoder 223. The past scan line counter 218 determines which of the past latches is being decoded at a given time. At a count of zero, the first latch is selected. At the count of 1, the second latch is selected, etc.

Figure 10:
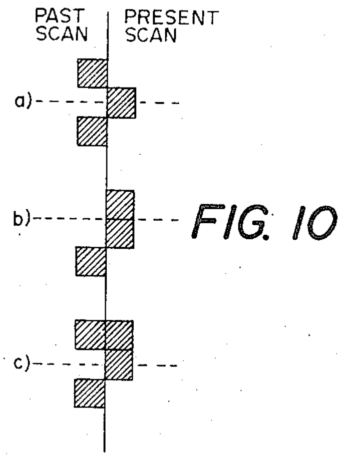
FIG. 10 illustrates the manner in which character line intersections are detected from scanning information by the circuit of FIG. 6.

Upon the occurrence of the red line, a starting code is forced into each of the present latches that have been enabled by the decoder 205. The meeting of two lines to effect a topo closure is detected when in the present scan the present or future bit is black and in the past scan the present or future bit is black. These conditions are illustrated in the FIG. 10 *a–c*. When the proper conditions for closure are met, a strobe pulse XSTB is generated which effects storage of closure information in the topo register of FIG. 8. The particular topo closed is defined by the codes present in the latches at the time the closure was detected.

During the analysis of data by the circuitry of FIG. 6, no code is recognized until one bit above the line under consideration. Further, the code which is placed ina particular latch is purely temporary in nature and does not become permanent until the next black to white transition corresponding to a counter increment. That is, the code may change one or several times within an area defined by two black to white transitions. Additionally, once a code is entered into a latch, a no-code condition cannot exist in that latch during that particular scan.

The following is a description of the operation of the post-red line circuitry as the character three (3) shown in FIG. 7 is scanned and processed.

Red Line Scan

Upon the first scan after detection of the red line, a red line disable unit 241 is actuated to apply a high signal to the line 242 leading from the output of transform 220 to the input of transform 203. This signal enables data to be loaded into the present scan line latches even though there is nothing stored in the past scan line latches. At the beginning of the scan, after all the registers and counters have been cleared, a force code signal is applied to the line crossing code unit 231 to pace the first line code via leads LXT1 and LXT2 at the inputs of each one of the present scan line latches 206 – 211. The present scan line crossing counter 204 and the decoder 205 enable the first present latch 206 over lead LNX1 to load the first line code into that latch as (00). The third bit position in the line latches is used to indicate that a valid code, as opposed to a "no-code," is presently stored in the latch.

Upon the occurrence of the first black to white transition at the red line, i.e., between bits B and C. the present scan line crossing counter 204 is incremented and decoded by the decoder and AND gates 205 to enable the second present scan line latch 207 over lead LNX2. At bit E the second line code (01) is loaded into the previously enabled second present latch 207. The present scan line counter 204 is again incremented at the transition between bits F and G and decoded by the decoder 205 to enable the third present latch 208 via lead LNX3. At bit J, the third line code (10) is loaded into the third present latch 208.

The present scan line counter 204 is again incremented at the black to white transition between bits J and K and the count is decoded to energize lead LNX4 and enable the fourth present latch 209. The fourth line code (11) is loaded into the latch 209 at bit R. The present counter 204 is incremented between bits R and S to enable the fifth present scan latch 210; however, no information is loaded into the latch since the scan is over. At the end of the red line scan, the red line disable circuit 241 is de-energized and the RC02 FORCE CODE input to the line crossing code unit 231 is disabled. At the end of the scan each one of the counters 204 and 218 are cleared and the contents of the present line latches 206 – 211 are loaded into the past scan line latches 212 – 217. The contents of the past latches at the beginning of scan 1 are as follows: latch 212 = (00); latch 213 = (01); latch 214 = (10); and latch 215 = (11). The remainder of the past scan line latches 216 and 217 contain "no-code" indications.

Scan 1

At the beginning of scan 1, both the present and past scan line crossing counters 204 and 218 contain counts of zero. The present counter 204 is decoded at 205. However, because the red line disable unit 241 is no longer in operation, there must be a high signal on lead 248 from the transform 203 before the line LNX1 is energized to enable a line code from 231 to be placed in the first present latch 206. At bit A, the scan delay unit 202 outputs a high signal RTSD on line 221 which is the past scan, future bit. The output signal RTSB from the bit delay unit 219 is low and represents the past scan, present bit. The past scan line counter 218 is decoded at 223 to connect the first past latch 212 through the leads LXC1 and LXC2. The signal NCPS on line 224 from the decoder 223 is high since the decoded past latch 212 contains a valid line code and, therefore, there is not a "no code" in that latch. The high RTSD signal on line 221 passes the OR gate 234 of the transform 220 and is placed on the input of the AND gate 235 along with the high no"no-code" signal NCPS on line 224. The output of the transform 220 is therefore high and is applied to one input of the AND gate 233 of the transform 203. A high RTRD signal on line 246 represents the present scan, future bit and a low BD signal on line 247 represents the present scan, present bit. The high on line 246 produces a high output from the OR gate 232 which is applied to the other input of the AND gate 233. The high output on line 248 from transform 203 produces an enable signal on line LNX1 from the decoder 205 to load a line code from the unit 231. Since the past decoder 223 is decoding the first past latch 212, the line code (00) stored therein is loaded through leads LXC1 and LXC2, the line crossing code unit 231, leads LXT1 and LXT2 into the first present latch 206.

The conditions of the latches remain the same for bit B and upon the black to white transition between bits B and C both the present counter 204 and the past counter 218 are incremented so that both the present and past decoders 205 and 223 are decoding the second present and past latches 207 and 213. The contents of the second present latch 207 remain a no-code until bit E at which time the presence of a past scan future bit produces a high signal RTSD on line 221. Since there is a valid line code in the decoded past latch 213, there is a high NCPS signal on lead 224 to produce a high at the out-put of the transform 220 on line 242. A high RTRD signal on line 246 generates a high output from transform 203 on line 248. The high on line 248 enables line LNX2 to load the line code (01) from the second past latch 213 through the line crossing code unit 231 into the second present latch 207.

No changes are made in the condition of the latches during bit F. The black to white transition between bits F and G increments both the present and past counters 204 and 223 to decode both the present and past third latches 208 and 214. At bit H, the third line code (10) is loaded from the third past latch 214 into the third present latch 208 in a similar fashion to the manner in which the first two latches were loaded earlier in the scan. Upon the occurrence of the black to white transition between bits J and K, the present and past counters 204 and 223 are again incremented and at bit Q the code (11) is loaded into the fourth present latch 209. The counters are again incremented between bits R and S but because the scan is finished a "no-code" bit remains in the fifth and sixth present latches 210 and 211. At the end of the scan the counters 204 and 223 are reset and the contents of the present latches are loaded into the past latches as follows: latch 212 = (00); latch 213 = (01); latch 214 = (10); latch 215 = (11); latches 216 and 217 = "no code".

Scan 2

At bit A, a high RTSD signal on line 221 due to a black past scan future bit, produces a high on line 242, and, together with the high RTRD signal on line 246 due to a black present scan, future bit, enables line 248. The high output from transform 203 on line 248 enables lead LNX1 to encode the first line code (00) from the first past scan latch 212, through the decoder 223, the line crossing code unit 231 and into the first present scan latch 206. Both present and past counters 204 and 218 are incremented at the black to white transition between bits B and C.

Upon the occurrence of bit D there is a black present scan future bit and therefore a high signal on line 246 which partially enables the AND gate 233 of transform 203. However, because there is a low signal on both line 221 (past scan future bit) and line 222 (past scan present bit) there is also a low output from transform 220 on line 242. These signals result in a low output from transform 203 on line 248 and line LNX2 is not enabled. At bit E, however, there are concurrently high signals on lines 221 due to a black past scan, future bit, and line 222 due to a black present scan, present bit so that the resulting high on line 248 enables lead LNX2 and loads the contents of the second past latch 213 into the second present latch 207 as (01).

The transition from bits E to F increments the present scan line counter 204 to decode the third present latch 208. At bit F, the black past scan, present bit produces a high signal on line 222 but because of the low signals on both lines 246 and 247 lead LNX3 remains disabled and no data is loaded into latch 208. Between bits F and G, the past scan line crossing counter 218 is incremented to then decode the contents of the third past latch 214. Upon the occurrence of bit H a high signal on both of the lines 246 and 221 serve to energize line 248 and load the line code (10) from the third past scan latch 214 through the line crossing code unit 231 and into the third present latch 208. Both counters 204 and 218 are again incremented at the black and white transition between bits J and k and at bit Q, the contents of the fourth past latch 215 is loaded into the fourth present latch 209 as the code (11). At the end of scan 2, both counters 204 and 218 are again reset and the contents of the present latches loaded into the past latches as follows: latch 212 = (00); latch 213 = (01); latch 214 = (10); latch 215 = (11); and latches 216 and 217 = "no code."

Scan 3

At bit A of scan 3 a high signal on lines 221 and 222 enable the decoder and AND gates 205 through a high on lead 248 and the line code (00) stored in the first past latch 212 is loaded into the first present latch 206. At the black to white transition between bits B and C, both counters 204 and 218 are incremented, and at bit D, a high signal on leads 221 and 222 effect loading of the code (01) from the second past latch 213 into the second present latch 207. Both counters 204 and 218 are again incremented by the black to white transition between bits E and F. At bit H, a high on leads 221 and 222 load the line code (10) from the third past latch 214 into the third present latch 208. The black to white transition between bits J and K increment both counters 204 and 218 and at bit Q the contents of the fourth past latch 215 are loaded into the fourth present latch 209. At the end of the scan, the line codes stored in the present latches are transferred to the past latches as follows: latch 212 = (00); latch 213 = (01); latch 214 = (10); latch 215 = (11); and latches 216 amd 217 = "no code."

Scan 4

At bit A, high RTSD and RTSB signals on lines 221 and 222, respectively, effect loading of the line code (00) from the first past latch 212 into the first present latch 206. At the black to white transition between bits B and C the past scan counter 218 is incremented to decode the second latch 213 while the decoder 205 is still enabling lead LNX1 to the first present latch 206. At bit C, a black present scan, present bit results in a high signal on lead 247, however, the low signal on both leads 221 and 222 produce a low signal on line 242 from the transform 220 to the transform 203. This condition produces a low signal on line 248 and the code stored in latch 206 remains (00). The transition between bits C and D, increments the present line crossing counter 204 and at bit D the code (01) stored in the second past latch 213 is loaded into second present latch 207, due to a high signal on leads 221 and 222. at the black/white transition between bits E and F both the present and past counters 204 and 218 are incremented and at bit h, the contents of the third past latch 214 are loaded into the third present latch 208 as a code (10). Both of the counters 204 and 218 are incremented at the transition between bits J and K and at bit Q the line code (11) stored in the fourth past latch 215 is loaded into the fourth present latch 209. At the end of the fourth scan both counters 204 and 218 are cleared and the contents of the present latches are loaded into the past latches as follows; latch 212 = (00); latch 213 = (01); latch 214 = (10); latch 215 = (11); and latches 216 and 217 = "no code."

Scan 5

At bit A, a low signal on both leads 246 and 247 result in a low on line LNX1 and the contents of the first present latch 206 remains "no code." At bit B a black past scan, present bit and a black present scan, future bit produce high signals on lines 222 and 246, respectively, and the line code (00) is transferred from the first past scan latch 212 through the line crossing code unit 231 into the first present scan latch 206. Upon the occurrence of bit C there is a high on lead 222, due to a black past scan, present bit and a high signal remains on both leads 246 and 247. However, neither of the counters 204 or 218 have been incremented and the contents of the first present latch 206 remains the same code at (00). During the transition between bits C and D the past scan counter 218 is incremented to decode the second past latch 213 while the present scan counter 204 continues to enable the first present latch 206 via line LNX1. At bit D high signals on lines 221, 246 and 247 effect loading of the line code (01) from the second past latch 213 into the first present latch 206. It should be recalled that the line code contents of the present latches may be changed several times within a topo area defined by the black to white transition.

At bit E, a high signal on line 222 due to a black past scan, present bit and high signals on both of the lines 246 and 247 enable the lead 248 from the transform 203. However, because the present scan counter 204 is still decoded to enable the first present latch 206 and the past scan counter 218 is still decoded to enable the second past latch 213, the contents of the first present latch 206 remains the same at (01). At bit E, however, one of the conditions for line intersection is satisfied. As stated above, a line intersection and topo closure condition is satisfied if (a) the present scan present or future bit is black and (b) the past scan present or future bit is black. The line closure is similar to that illustrated in FIG. 10(*b*). The closure condition is detected by the circuitry of FIG. 8, which comprises a transform 224 including a previous line code storage register 225 and a topo strobe 226. The register 226 stores the last previous line code crossed and the next line code to be crossed. for example, when a topo closure is detected at bit E, line codes (00) and (01) are stored in register 225, therefore the conclusion can be drawn that topo 1 has been closed. When a crossing indication is detected on the BD, RTSB and RTSD leads by the topo strobe 226 a high is produced on lead XSTB and gates 227 – 229 transfer the proper topo closure from the register 225 into the right topo register 230.

Still following scan 5 after the detection of a line intersection at bit E, the black to white transition between bits E and F increments the past scan line crossing counter 218 and low signals on both lines 221 and 222 at bits F and G inhibit any further modifications of the codes stored in the present latches. At bit H, high signals on line 221 and line 247 enables lead 248 which effects loading of the code (10) stored in the third past scan latch 214 into the second present scan latch 207. Also at bit H, a second line intersection is detected by the circuitry of FIG. 8 and is similar to that illustrated in FIG. 10 (*b*). The lines having codes (01) and (10) have intersected closing topo 2. This closure information is then stored in the right topo register 230.

Referring again to FIG. 6, between bits H and J a black to white transition increments the present scan line counter 204 and a black to white transition between bits J and K increments the past counter 218. At bit Q high signals on leads 247 and 221 transfer the line code (11) from the fourth past latch 215 to the second present latch 207. both counters 204 and 218 are incremented at bits R and S, respectively, and then reset at the end of the scan. At the end of the fifth scan the data stored in the present latches is transferred to the past latches as follows: latch 212 = (10); latch 213 = (11); latches 214, 215, 216 and 217 = "no code."

Scan 6

At the beginning of Scan 6 both the counters 204 and 218 are cleared. Low signals are present on both leads 246 and 247 up until bit F. At that time, a high signal on lead 246 together with high signals on both leads 221 and 222 enables lead 248 and the line code stored in the first past scan latch 212 is loaded into the first present scan latch 206. At bit G, the code remains the same and during the black to white transition between bits G and H the present scan counter 204 is incremented and the decoder 205 enables the second present latch 207 via lead LNX2. At bit H, however, low signals on both leads 246 and 247 inhibit any information transfer from taking place. The black to white transition between bits H and J increment the past scan counter 218 to decode the second past scan latch 213. Bit P produces a high on leads 247 and 221, and therefore a high signal on lead 248 to transfer the line code (11) from the second past latch 213 into the second present latch 207. At the end of the sixth scan the contents of the present latches are loaded into the past latches as follows: latch 212 = (10); latch 213 = (11); the remainder of the latches = "no code."

Scan 7

Nothing occurs in Scan 7 until bit F at which time high signals on leads 221 and 246 transfer the line code (10) from the first past latch 212 to the first present latch 206. At the transition between bits G and H, the past counter 218 is incremented and the decoder 223 decides the second latch 213. At bit N a closure is detected by the circuitry of FIG. 8 and the information stored in the line code storage register 225 indicates that the lines having codes (10) and (11) have intersected and therefore the third topo has closed. The closure is similar to that illustrated in FIG. 10(*b*). At this point of Scan 7, information is stored in the topo register 230 which indicates three topos have been closed. The three topos were closed by four line closures, the maximum of the embodiment of the present system therein described. No significant changes are made in the settings of the counters and latches for the remainder of the scan. Following the end of scan 7, detection circuitry notes that the last of the character data has passed the scanner and the circuitry is reset for the beginning of the scan of the next character.

Post-Red Line Logic

Figure 12:
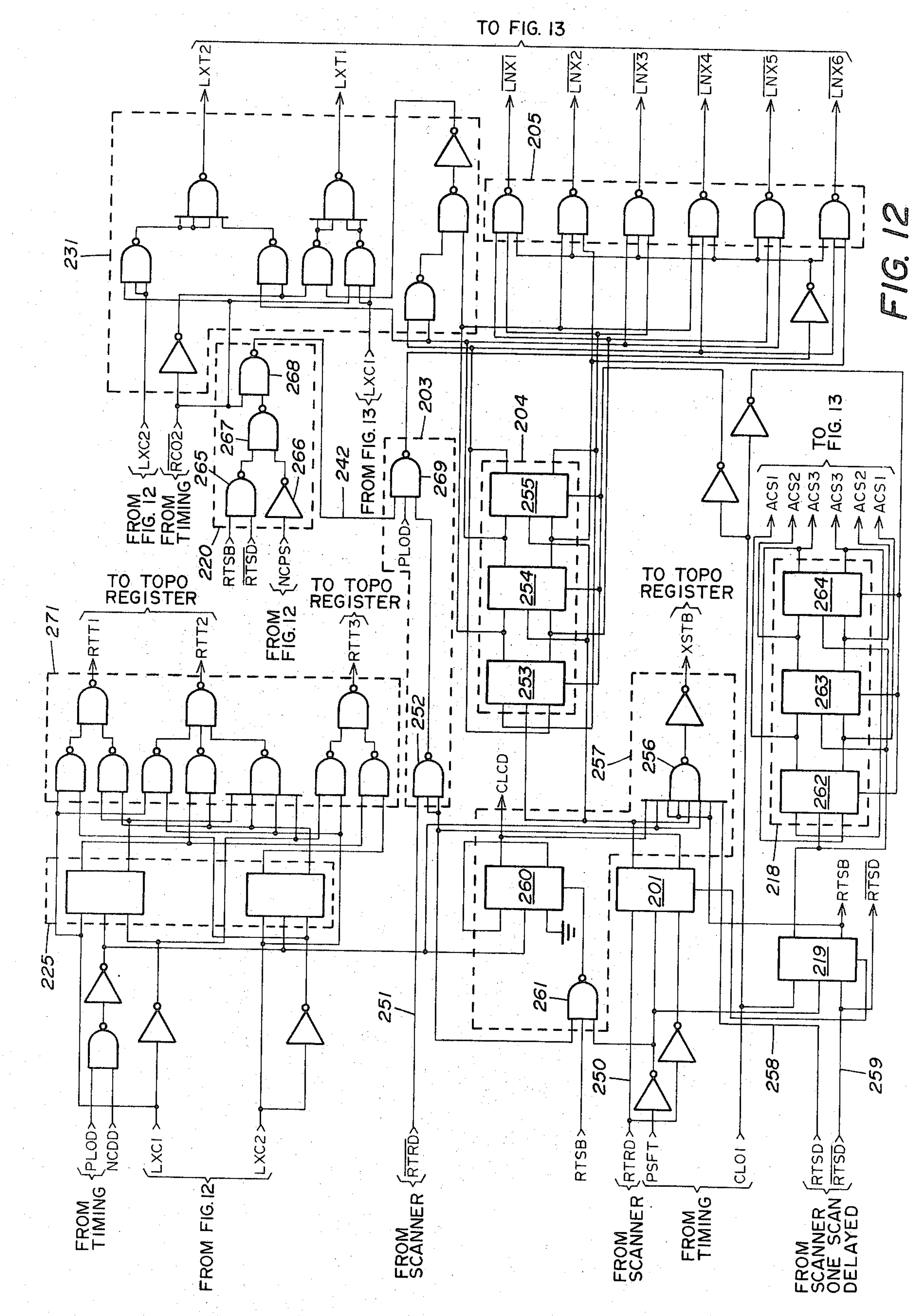
FIGS. 12 and 13 together comprise a logic diagram of the character processing system shown in FIG. 6.
Figure 13:
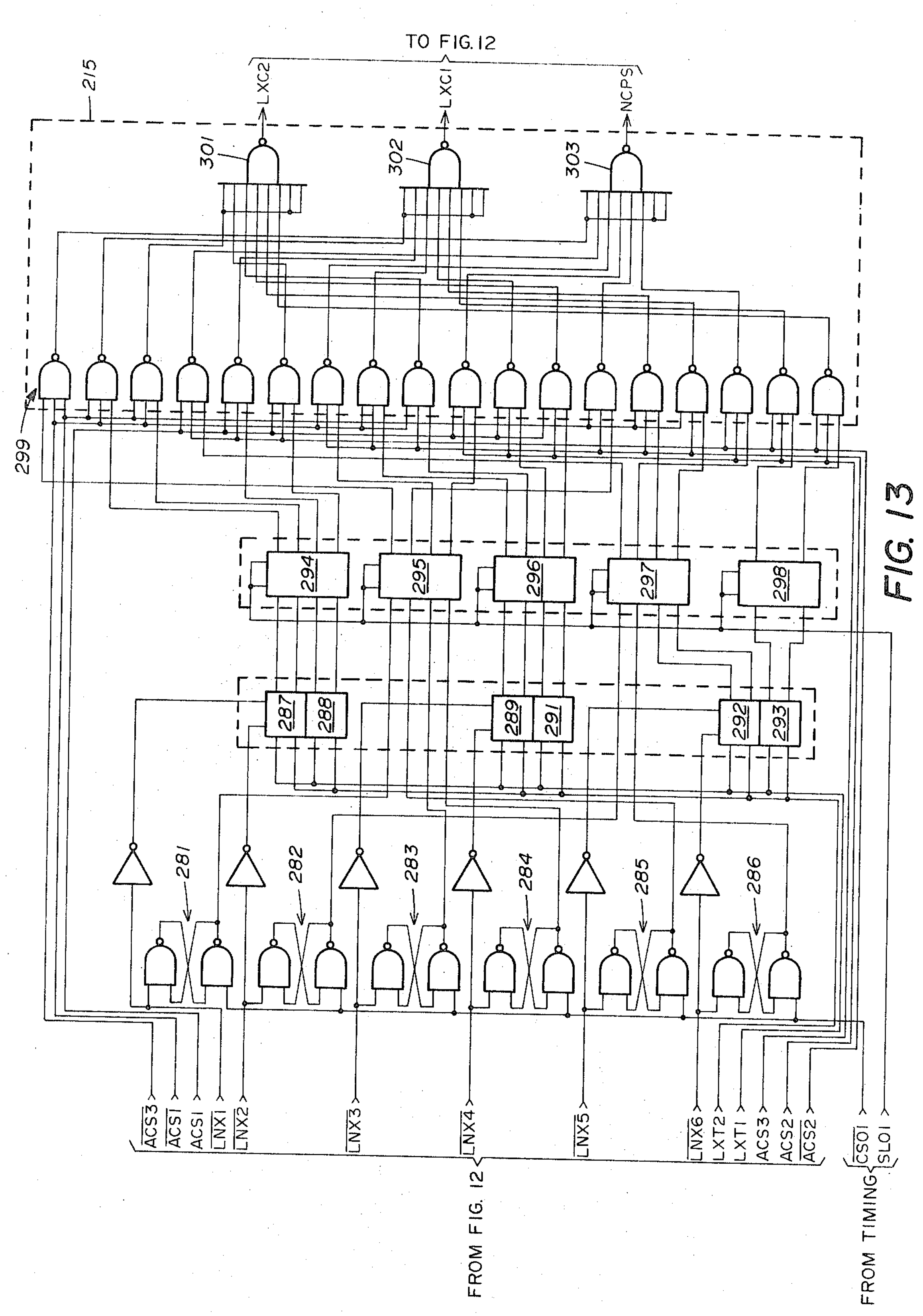

The detail logic which effects the functions of the circuitry of FIG. 6 is shown in FIGS. 12 and 13.

Figure 11:
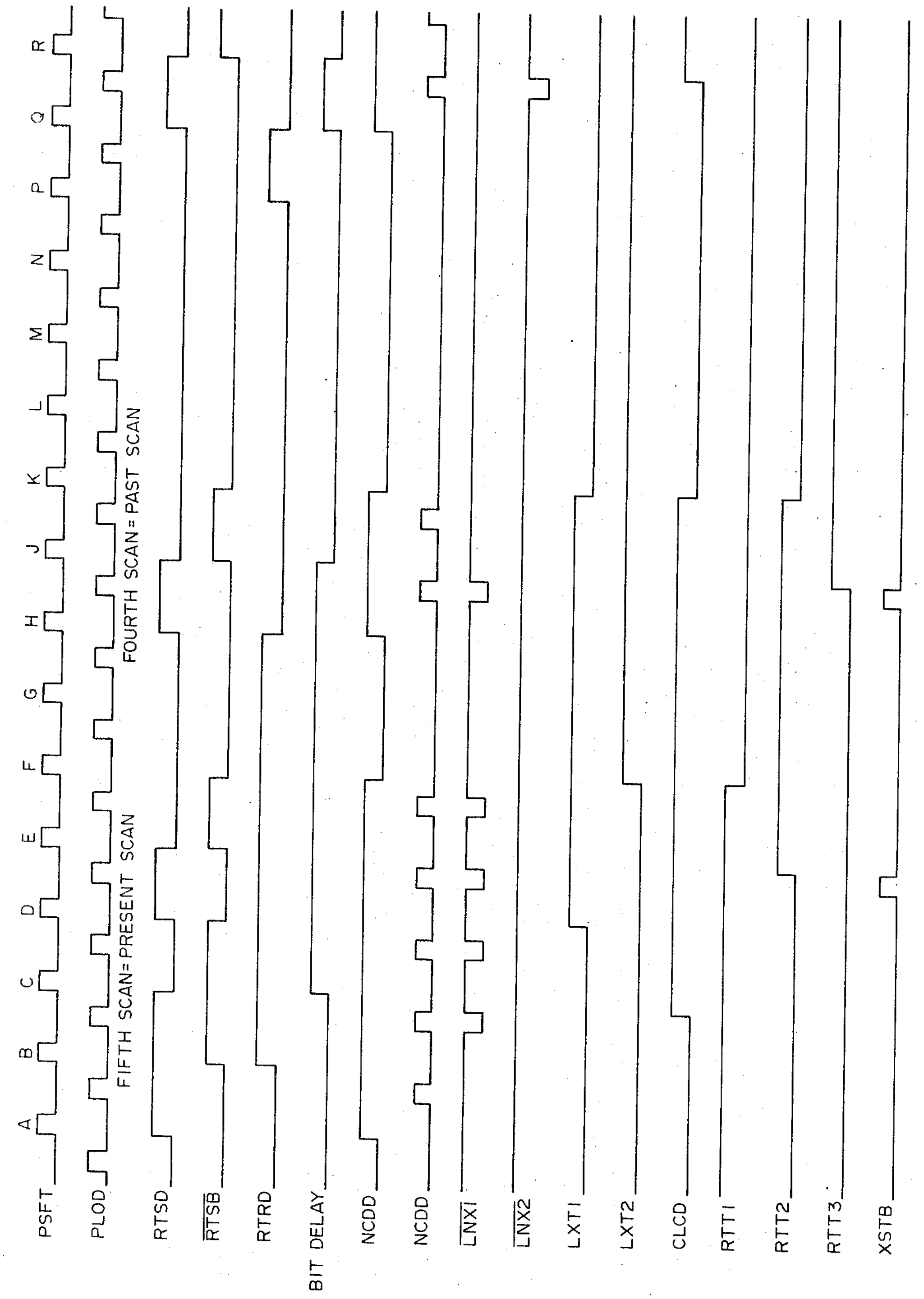
FIG. 11 is a timing diagram illustrating the data and control signals of the system of FIGS. 12 and 13.

The timing diagram of FIG. 11 illustrates the sequence within which information is transferred among the various units of the circuitry where scan 5 is the present scan. In FIGS. 11, 12 and 13, the abbreviations and nomenclature used are shown in Table III as follows:

TABLE III

| | |
|---|---|
| PSFT | Shift pulses |
| PLOD | Strobe pulses |
| RTRD | Sample video input |
| RTSD | Sample video one scan delayed |
| $\overline{RTSB}$ | Reciprocal of sample video input one scan and one bit delayed |
| BD | Sample video one bit delay |
| $\overline{NCDD}$ | Timing pulses |
| $\overline{LNX1}$ | Reciprocal of the line crossing 1 clock |
| $\overline{LNX2}$ | reciprocal of the line crossing 2 clock |
| LXT1 | Line crossing code bit 1 after transformation |
| LXT2 | Line crossing code bit 2 after tramsfprmation |
| CLCD | Close condition detect |
| RTT1 | Right topo transfer pulse 1 |
| RTT2 | Right topo transfer pulse 2 |
| RTT3 | Right topo transfer pulse 3 |
| XSTD | Topo strobe pulse indicating line closure |

As shown in FIG. 12, a video scanning signal RTRD is applied to input line 250 while $\overline{RTRD}$ is applied to input lead 251. Line 250 is connected to a one bit delay flip-flop 201. The output of flip-flop 201 is connected to an input gate 252 of the transform 203, to the present scan line crossing counter 204, a gate 261 and a topo strobe gate 256 which form part of the closed condition detect circuit 257. The counter 204 comprises three flip-flops 253, 254 and 255 which are connected in sequence to form an impulse counter. Video data signal RTSD is the same data as RTRD except delayed one scan through shift register storage by means not shown. RTSD is applied to an input line 258 which is connected both to a one bit delay flip-flop 216 and to the gate 256 of the closed condition detector 257. A signal $\overline{RTSD}$ is also applied to the bit delay flip-flop 216 via line 259. Timing pulses PSFT are applied to the bit delay unit 201.

The output signal RTSB of the bit delay unit 216 is the video data one scan and one bit delayed. RTSB is connected to the input gate 261 within the closed condition detector 257. The output of the gate 261 is connected to a closed condition detector flip-flop 260 which produces an output signal CLCD upon detection that two of the character lines being tracked have intersected enclosing a topo. The output of the one bit delay unit 216 is connected to the input of the past scan line counter 218 which includes flip-flops 262, 263 and 264 connected to form an impulse counter. The output of the counter 218 includes lines ACS1 – ACS3 and $\overline{ACS1}$ – $\overline{ACS3}$ which are connected to the circuitry shown in FIG. 13. The RTSB signal, which represents the past scan present bits, and the RTSD signal which represents the present scan future bits, are connected to a gate 265 within the transform 220. The output of gate 265 is connected to one input of AND gate 267. The NCPS signal which is high in the absence of a no-code signal, is connected through an amplifier 266 to one input of the AND gate 267. The output of AND gate 267 is connected to a gate 268 which produces the output of the transform 220.

The output of transform 220 is connected to gate 269 of transform 203 via line 242. The other inputs to gate 269 comprise the output of gate 252 and a timing signal PLOD. The output of the transform 203 is connected to the present scan decoder and AND gate 205. The output of the decoder 205 comprises leads $\overline{LNX1}$ – $\overline{LNX6}$ which are connected to the circuitry of FIG. 13. Referring now to FIG. 13, there are shown six one bit no-code latches 281 – 286 which, together with six two bit line code latches 287 – 293 make up the six three bit present latches 206 – 211 of FIG. 6. In the logic of FIG. 13 the functions of no-code storage and line code storage have been separated into different units 281 – 286 and 287 – 293, respectively. The outputs of both the present scan no-code latches 281 – 286 and the present scan line code latches are connected directly to the past scan line latches 294 – 298. For design purposes the present and past latches have not been connected to one another on a one to one basis but rather storage has been arranged for the most convenient circuit layout. For example, the output of the first, present scan no-code latch 281 is connected to the first storage cell within the past scan line latch 295, and the two bit line code signal from the first present latch 287 is stored in the first two cells of the past scan line latch 294. The outputs of the past scan line latches 294 – 298 are connected to the input of the decoder and sampler circuitry 215. The decoder 215 includes a plurality of sampling gates 299 and three output gates 301 – 303 which produce signals on the LXC1, LXC2 and NCPS leads connected to FIG. 12. The LXT1 and LXT2 leads from the output of the line crossing code unit 231 of FIG. 12 are connected to the input of the present scan latches 287 – 293 of FIG. 13. The output leads ACS1 – ACS3 and $\overline{ACS1}$ – $\overline{ACS3}$ from the past scan line crossing counter 218 of FIG. 12 is connected to the input of the past scan decoder and sample 215 of FIG. 13 along with various timing signals SL01 and CS01 from the system timing circuit (now shown).

In operation, the scanned information on lines 250 and 251 is coupled into the bit delay unit 201 and the transform 203. While one scan delayed data on lines 258 and 259 is connected to the line closure detector 257 and the one bit delay 216, the present scan line crossing counter 204 registers black to white transitions and the count is decoded by the decoder and AND gates 205 to encode signals from the line crossing code unit 231 into the present scan line latches 281 – 286 and 287 – 293 of FIG. 13. At the beginning of the red line scan, a $\overline{\textbf{RC02}}$ signal is applied to the line crossing code unit 231 to force a code from the unit and load the present scan line latches 281 – 286. On subsequent scans the signal on the LXC1 and LXC2 leads from the decoder and sampler 205 is connected through the line crossing code unit 231 into the present scan line latches 281 – 286. At the end of each scan, the data from the present scan line latches 281 – 286, 287 – 293 are loaded into the past scan latches 294 – 298. The output of the past scan line latches 294 – 298 is decoded by the decoder and sampler 215 on the LXC1, LXC2 and NCPS leads. Upon the occurrence of a line intersection, the closed condition detector 257 produces a topo strobe signal XSTB which gates the RTT1 – RTT3 data, telling which topo has closed, into the topo register of FIG. 8. A plurality of timing signals PSFT, PLOD, SL01, $\overline{\textbf{CS01}}$ are supplied by the system timing circuit (not shown) to synchronize the operation of the interconnected logic.

Figure 8:
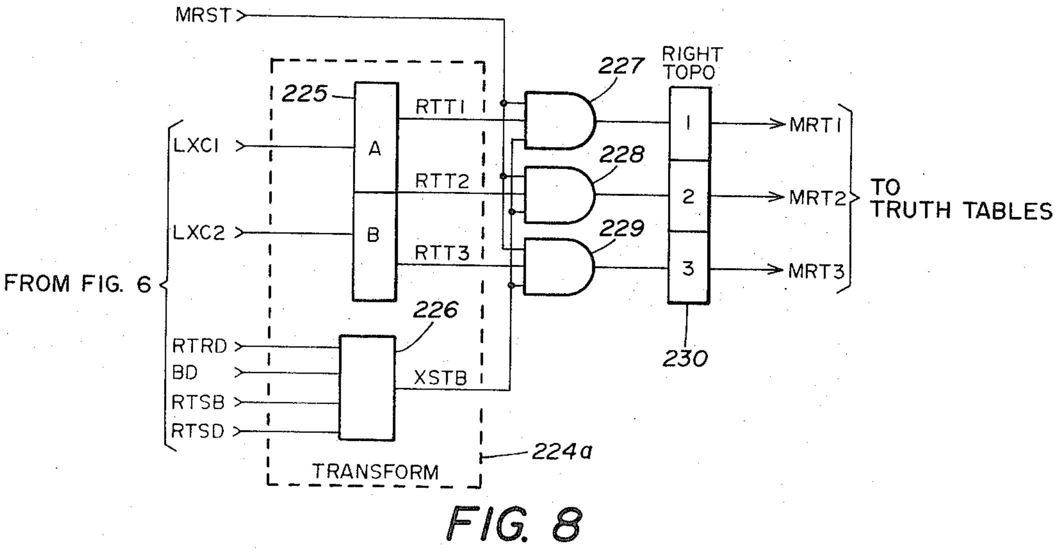
FIG. 8 is a schematic diagram of topology storage registers used in conjunction with the system shown in FIG. 6.

From the description of the logic circuitry shown in FIGS. 12 and 13, it can be seen how a plurality of lines forming a character are tracked in a direction away from the red line and an intersection of two or more lines is detected to produce a topo closure signal and indicate which topos of the character have closed and which remain open. At the end of the scanning operation, signals on the MRT1 – MRT3 leads from the topo register of 230, of FIG. 8, are sent to the truth tables for a character decision. The truth tables store a plurality of stored characteristics with which the topo information is compared to arrive at a correct character decision.

It can further be seen how the pre-red line transform described first differs from and complements the function of the post-red line transform just described. The two techniques function to provide analysis of the complete character without unnecessary storage and redundant equipment. It is to be understood that either the pre-red line transform technique or the post-red line transform technique of the invention could be used independently of one another to analyze a character under consideration.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of identifying a character executed substantially in accordance with a predetermined format relative to a vertical center bar extending through a field in which said character reposes, comprising the steps of:

scanning said character in one vertical direction along a plurality of vertically aligned laterally spaced paths, generating white field signals and black field signals representative of white and black fields at each of a plurality of points on each of said paths, sequentially comparing the signal from each given point with signals representing the point immediately above in the present scan, and the adjacent point in the preceding scan with reference to said center line, modifying the signal from each given point in accordance with the results of the comparison of the point immediately above and the adjacent point, generating enclosed point signals when any white field is enclosed by black field portions and said center line, and comparing said enclosed point signals for each of a plurality of zones of said field defined vertically by said bar and the sides of said field and horizontally by a horizontal line passing through center bar crossings and by the top and bottom of said field with a code for each symbol to produce symbol identification signals.

2. The method according to claim 1 wherein said code and said signals compared therewith are modified in dependence upon the number of crossings of said bar by said character.

3. The method according to claim 1 wherein said code and said signals compared therewith are modified by projection signals dependent upon the projection onto said center bar of the right half and of the left half of each character.

4. The method according to claim 1 wherein said code and said signals compared therewith are modified by projection signals dependent upon the projections onto said center bar of both the right half and the left half of said character.

5. The method of claim 1 wherein said code and said signals compared therewith are modified in dependence upon the crossing signals representative of the numbers of crossings by said character of a vertical line spaced to one side of said bar.

6. A method for recognition of alphanumeric characters which are superimposed upon a vertical character center line where representations of such characters are scanned along a plurality of successive parallel scan lines which repeatedly traverse the character in the same direction along successive lines which are displaced from each other to derive for elemental areas of such scan lines a black signal representative of an element of the character or a white signal representative of an element of the background area for control of character selection comprising the steps of:

storing a code on each scan indicative of any change in the vertical location of each black character portion from its position on the immediately preceding scan, generating a closure signal in response to two or more stored codes being indicative of an intersection between two or more of said black character portions, generating character signals representative of a background area completely enclosed by a boundary formed of a black portion of the character and said center line in response to intersection of at least two of said scanned black character portions, generating a code signal representative of the character scanned in response to said character signals, and decoding said code signal by stored character comparison means for generating an output signal uniquely representative of said character.

7. A method for recognition of alphanumeric characters as set forth in claim 6, wherein said storing step also includes:

counting the number of black character portions crossed during each scan; and selecting the particular register in which a code is to be stored in response to said count.

8. A system for identifying characters executed substantially in accordance with a predetermined format relative to a vertical center bar extending through a field in which each character reposes which comprises:

a. first means for scanning said character in one vertical direction along a plurality of vertically aligned laterally spaced paths;

b. second means for generating white field signals and black field signals representative of white and black fields at each of a plurality of points along each said path;

c. third means for sequentially comparing the signal from each given point with signals representing the point immediately above and the adjacent point in the preceding scan with reference to said center line to modify said signal from said given point to generate enclosed point signals when any white field is enclosed by black character portions and said center line; and d. fourth means for comparing said enclosed point signals for each of a plurality of zones of said field defined vertically by said bar and the sides of said field and horizontally by a horizontal line passing through center bar crossings and by the top and bottom of said field with a code for each symbol to produce symbol identification signals.

9. In a system for automatic recognition of alphanumeric characters which are superimposed upon a vertical character center line where representations of such characters are scanned in one vertical direction along a plurality of successive parallel scan lines which repeatedly traverse the character in the same direction along successive lines which are displaced from each other to derive for elemental areas of such scan lines a black signal representative of an element of the character or a white signal representative of an element of the background area for control of character selection, the combination which comprises:

a. means responsive to the derived signals from each elemental area for transforming a white background signal into a first signal when the element area represents a background area completely enclosed by a boundary formed by a portion of the character and said center line and for transforming a white background signal into a second signal when the element area represents a background area not so enclosed, said means responsive to the derived signals from each elemental area including means to transform each derived signal in accordance with the elemental area signals immediately above and immediately adjacent on one side;

b. means for generating, in response to said black signal, said first and said second signals, a code of the scanned character dependent upon existence and absence of enclosed areas; and c. decoder means responsive to said code for producing an output signal uniquely representative of said character.

10. A system for recognition of alphanumeric characters which are superimposed upon a vertical character center line where representations of such characters are scanned along a plurality of successive parallel scan lines which repeatedly traverse the character in the same direction along successive lines which are displaced from each other to derive for elemental areas of such scan lines a black signal representative of an element of the character or a white signal representative of an element of the background area for control of character selection, said system comprising:

means for assigning a storage register to each black signal representative of a portion of said character vertically spaced from one another;

means for storing a code in each register, on each scan, indicative of any change in the vertical location of each black character portion from its position on the immediately preceding scan;

means for generating a closure signal in response to the code in two or more storage registers being indicative of an intersection between two or more of said black character portions;

means for generating character signals representative of a background area completely enclosed by a boundary formed of a black portion of the character and said center line in response to the closure signal;

means responsive to said character signals for generating a code signal representative of the character scan;

means for decoding said code signal by stored character comparison; and means for generating an output signal uniquely representative of said character.

11. A system for recognition of alphanumeric characters as set forth in claim 10 including:

means for counting the number of black character portions crossed during each scan; and means for selecting the particular register in which a code is to be stored in response to said count.

* * * * *

PO-1050
(5/69)

UNITED STATES PATENT OFFICE
CERTIFICATE OF CORRECTION

Patent No. 3,786,416 Dated Jan. 15, 1974

Inventor(s) Chetan Vijaysinh Bhimani Page 1

It is certified that error appears in the above-identified patent and that said Letters Patent are hereby corrected as shown below:

Col. 3, line 52, "column" should be --columns--;
line 58, "13" should be --4--;
Col. 7, line 7, "25" should be --31--;
line 18, "39" should be --46--;
line 28, "18" should be --20--;
line 44, "40" should be --46--;
line 55, before "produced" insert --low and no output is--;
line 59, after "at" insert --inverter--;
line 63, "the scan 2" should be --the second scan--;
line 66, after "the" cancel "present".
Col. 8, line 1, "52" should be --OCPF--;
line 6, after "at" (1st occurrence) insert --inverter--;
line 8, "N to p" should be --N to P--;
line 10, "26" should be --32--;
line 25, "39" should be --46--;
line 26, "the scan 3" should be --the third scan--;
line 27, "with scan 2." should be --with the second scan.--;
line 29, "4" should be --four--;
line 33, "4" should be --four--;
line 37, after "first" insert --past--;
line 44, "34" should be --35--;
line 44, "24" should be --25--;
line 51, "4" should be --four--;
line 53, "of scan 5" should be --of the fifth scan--;
line 57, "5" should be --five--;
line 63, "5" should be --five--.
Col. 9, line 1, "5" should be --five--;
line 3, "5" should be --five--;
line 8, "6" should be --six--;
line 15, "7" should be --seven--;
line 19, "7" should be --seven--;
line 26, "8" should be --eight--;
line 51, "113-117" should be --114-117--;
line 62, cancel "present decoders and";
line 63, after "gates" insert --of the decoder--.
Col. 10, line 8, "Arthur W. holt" should be --Arthur W. Holt--;
line 43, "218" should be --223--;

PO-1050
(5/69)

UNITED STATES PATENT OFFICE
CERTIFICATE OF CORRECTION

Patent No. 3,786,416 Dated Jan. 15, 1974

Inventor(s) Chetan Vijaysinh Bhimani Page 2

It is certified that error appears in the above-identified patent and that said Letters Patent are hereby corrected as shown below:

Col. 10, line 57, cancel "and" and insert --having outputs connected--.
Col. 12, line 25, "ina" should be --in a--.
Col. 13, line 21, "1" should be --one--;
line 34, after "LXC2" insert --to the unit 231--.
Col. 14, line 9, "223" should be --218--;
line 16, "223" should be --218--;
line 21, "223" should be --218--;
line 66, "k" should be --K--.
Col. 15, line 2, "2" should be --two--;
line 8, "3" should be --three--;
line 49, "h" should be --H--.
Col. 16, line 33, "224" should be --224a--;
line 34, after "strobe" insert --register--;
line 41, after "strobe" insert --register--.
Col. 17, line 32, "decides" should be --decodes--;
line 68, "tramsfprmation" should be --transformation--.
Col. 18, line 19, "216" should be --219--;
line 21, "216" should be --219--;
line 24, "216" should be --219--;
line 33, "216" should be --219--,
Col. 19, line 23, "216" should be --219--.

Signed and sealed this 16th day of July 1974.

(SEAL)
Attest:

McCOY M. GIBSON, JR.
Attesting Officer

C. MARSHALL DANN
Commissioner of Patents